US009077135B2

(12) United States Patent
Schäfer et al.

(10) Patent No.: US 9,077,135 B2
(45) Date of Patent: Jul. 7, 2015

(54) BUSH FITTING MACHINE

(75) Inventors: Markus Schäfer, Bad Schoenborn (DE); Hansjörg Wolff, Leingarten (DE)

(73) Assignee: Schaefer Werkzeug-und Sondermaschinenbau GmbH, Bad Schoenborn (DE)

( * ) Notice: Subject to any disclaimer, the term of this patent is extended or adjusted under 35 U.S.C. 154(b) by 145 days.

(21) Appl. No.: 13/508,793

(22) PCT Filed: Oct. 7, 2010

(86) PCT No.: PCT/EP2010/065009
§ 371 (c)(1),
(2), (4) Date: Jul. 23, 2012

(87) PCT Pub. No.: WO2011/054619
PCT Pub. Date: May 12, 2011

(65) Prior Publication Data

US 2012/0272501 A1 Nov. 1, 2012

(30) Foreign Application Priority Data

Nov. 9, 2009 (EP) .................................... 09014007

(51) Int. Cl.
*H01R 43/055* (2006.01)
*H01R 43/01* (2006.01)
(Continued)

(52) U.S. Cl.
CPC ......... *H01R 43/005* (2013.01); *Y10T 29/53657* (2015.01); *Y10T 29/49826* (2015.01)

(58) Field of Classification Search
CPC .......... B23P 19/04; B23P 19/08; B23P 19/02; B23P 19/001; H01R 43/01; H01R 43/20; H01R 43/055
USPC ........... 29/771, 235, 787–790, 782, 783, 753, 29/754, 728
See application file for complete search history.

(56) References Cited

U.S. PATENT DOCUMENTS 2,683,924 A * 7/1954 Schryver ......................... 29/754
5,016,346 A * 5/1991 Gerst et al. ...................... 29/754
(Continued)

FOREIGN PATENT DOCUMENTS

CN 1677756 A 10/2005
CN 101212114 A 7/2008
(Continued)

OTHER PUBLICATIONS

Pick up; defintion; Merriam Webster; http://www.merriam-webster.com/dictionary/pick%20up; p. 1.*
(Continued)

*Primary Examiner* — David Bryant
*Assistant Examiner* — Bayan Salone
(74) *Attorney, Agent, or Firm* — Wolf, Greenfield & Sacks, P.C.

(57) ABSTRACT

The present invention relates to a machine for delivering supplied hollow bushes and for fitting individual hollow bushes to a cable, and to a corresponding method. The apparatus has a picking apparatus which can pick up hollow bushes and arrange said hollow bushes so as to be axially aligned in front of the fitting tube, and a bush fitting apparatus for fitting individual hollow bushes to a cable, wherein the bush fitting apparatus has a fitting tube which can receive and hold, on the outer surface of said tube, the hollow bushes on the inner surface thereof, and in which the cable for fitting the hollow bushes can be arranged. Furthermore, the apparatus has a delivery apparatus with a slip-over device which is capable of moving relative to the picking apparatus and by means of which the hollow bushes can be delivered from the picking device to the fitting tube, and a filling mandrel, which can protrude through the fitting tube in order to deliver the hollow bush from the picking apparatus onto the bush fitting apparatus and can withdraw from the fitting tube in order to fit the hollow bush to the cable.

15 Claims, 11 Drawing Sheets

(51) Int. Cl.

| | |
|---|---|
| ***H01R 43/20*** | (2006.01) |
| ***B23P 19/04*** | (2006.01) |
| ***B23P 19/08*** | (2006.01) |
| ***B23P 19/00*** | (2006.01) |
| ***H01R 43/00*** | (2006.01) |

(56) References Cited

U.S. PATENT DOCUMENTS

| | | | | |
|---|---|---|---|---|
| 5,351,385 | A * | 10/1994 | Takano | 29/450 |
| 5,432,996 | A * | 7/1995 | Imgrut et al. | 29/754 |
| 5,706,569 | A * | 1/1998 | Miyamoto et al. | 29/564.1 |
| 5,743,002 | A * | 4/1998 | Ito et al. | 29/754 |
| 5,901,438 | A * | 5/1999 | Kurihara | 29/857 |
| 5,926,947 | A * | 7/1999 | Takano et al. | 29/754 |
| 6,134,769 | A * | 10/2000 | Takano et al. | 29/450 |
| 6,393,684 | B2 * | 5/2002 | Masuda et al. | 29/235 |
| 6,401,331 | B1 * | 6/2002 | Mizuno | 29/771 |
| 6,467,154 | B1 * | 10/2002 | Beggs | 29/701 |
| 6,671,954 | B2 * | 1/2004 | Nomoto | 29/881 |
| 7,325,297 | B2 * | 2/2008 | Xia | 29/724 |
| 7,338,320 | B2 * | 3/2008 | Kobayashi | 439/587 |
| 7,363,703 | B2 * | 4/2008 | Imgrut | 29/754 |
| 7,810,230 | B2 * | 10/2010 | Ikeda et al. | 29/748 |
| 7,963,032 | B2 * | 6/2011 | Signer | 29/857 |
| 8,713,771 | B2 * | 5/2014 | Urbaniak et al. | 29/235 |
| 2005/0179209 | A1 * | 8/2005 | Kobayashi | 277/560 |
| 2008/0155816 | A1 * | 7/2008 | Ikeda et al. | 29/748 |

FOREIGN PATENT DOCUMENTS

| | | | |
|---|---|---|---|
| EP | 1022821 | A1 | 7/2000 |
| EP | 0881720 | B1 | 9/2002 |

OTHER PUBLICATIONS

Lift; defintion; Merriam Webster; http://www.merriam-webster.com/dictionary/lift; p. 1.*

International Preliminary Report on Patentability dated May 15, 2012 from corresponding International Application No. PCT/EP2010/065009.

Search Report issued Apr. 30, 2014 in Chinese Application No. 2010800608958.

* cited by examiner

BUSH FITTING MACHINE

FIELD OF THE INVENTION

The present invention relates to a machine for delivering hollow bushes supplied by this machine and for fitting individual hollow bushes to a cable. Furthermore, the present invention relates to a method for delivering and fitting hollow bushes.

PRIOR ART

In the prior art different apparatuses and machines for fitting bushes are known. Bushes—also called “seals”—are used for the assembly of cable ends and are generally made of rubber or a material similar to rubber.

Bushes/hollow bushes are used to guarantee the moisture-proof passage of cables, e.g.

through housing walls of electrical appliances. For this purpose such a bush is generally applied to a stripped cable so that the bush remains on the cable. A tight connection is thus established between the cable jacket and the hollow bush. The hollow bush itself can then be fastened within the housing of an electrical appliance.

European Patent EP 0 881 720 B1 is known as prior art. The apparatus has a picking apparatus (reference number 50) with a mandrel the tip of which has a smaller diameter than the other mandrel, a radial inner groove being provided partially between the tip and the other mandrel (see FIGS. 9 and 10 of EP 0 881 720 B1). The structure and the production of such a mandrel are therefore complex.

This picking apparatus 50 is used to pick up a bush/hollow bush in an axial movement of the picking mandrel and to press it onto a fitting tube in the same direction of movement. For this purpose the tip of the mandrel of the picking apparatus plunges into the fitting tube, and the outer circumference of the fitting tube is introduced at least partially into the radial inner groove between the tip and the other mandrel (see FIG. 2 of EP 0 881 720 B1). The end region of the mandrel, which forms a step for the tip extending further, serves here to push the bush onto the fitting tube.

Next the mandrel moves back into its initial position and a further hollow bush is then delivered so as to later also “strike” the fitting tube.

Once the bush is located on the fitting tube and the mandrel has been moved back into its initial position, the fitting tube is turned and aligned in the direction of a stripped cable.

Next the hollow bush is applied to the cable by the movement of the fitting tube in the direction of the stripped cable. Furthermore, the fitting tube is moved back, and then a stop holding the hollow bush on the cable is opened. If the fitting tube then turns in alignment with the mandrel, the slip-away device moves back.

It is a disadvantage of the apparatus of EP 0 881 720 B1 here that the mandrel and the fitting tube must be aligned precisely to one another in order to be able to “strike” a hollow bush. Due to the complex configuration of the mandrel this alignment must be as accurate as possible so as to damage neither the mandrel nor the fitting tube. Furthermore, the hollow bushes are not separated, but are used directly from the conveyer. The delivery of the hollow bushes must accordingly coordinate with the “striking” so that, for example, there is no catching with the next hollow bush in the conveyor. Furthermore, it has proved to be disadvantageous that the conveyor device is blocked during the delivery of the hollow bush from the picking apparatus to the fitting tube, and no other procedural steps can be implemented in parallel.

Document EP 1 022 821 A1 is known as further prior art. With this apparatus a hollow bush is picked up and held with a mandrel by means of a picking apparatus. The mandrel is then guided to a bush holding part into which the hollow bush is introduced. After the mandrel of the picking apparatus has been moved away, a further mandrel is positioned over the bush holding part. This other mandrel is then used to push the hollow bush through the bush holding part and to place it on a fitting tube. The other mandrel thereby penetrates at least partially into the fitting tube.

This apparatus is turn has the disadvantage that the bush holding part is provided as an additional component. Moreover, the apparatus has a first mandrel as a fitting on the bush holding part, and optionally a further mandrel for delivering the hollow bush from the bush holding part onto the fitting tube. By means of this structure the hollow bushes are separated and then applied to the fitting tube, but a plurality of individual elements are required for this, and so the structure of the apparatus of EP 1 022 821 A1 is complex.

DESCRIPTION OF THE INVENTION

It is the aim of the present invention to provide a machine for delivering and fitting hollow bushes to a cable which simplifies the picking up of bushes without requiring a plurality of parts. In contrast to the prior art, one should moreover avoid having numerous components corresponding to one another in order to be able to fit hollow bushes of different sizes and distinctive in other ways. The hollow bushes in question are in fact characterised substantially by their inner and outer diameters so that hollow bushes with the same inner diameter do not necessary have to have the same outer diameter.

The aforementioned aims are achieved by a machine according to claim 1 and a method according to claim 9. Preferred embodiments of the invention are specified in the sub-claims.

An apparatus according to claim 1 offers the advantage that a minimum number of delivery components/fitting components is provided, and any slight deviations in the alignment of the pick-up apparatus and of the fitting tube do not cause damage to any of the components, but can be evened out mechanically. Moreover, the individual elements/components of the apparatus according to claim 1 have a simple structure, and this in turn leads to inexpensive production.

Furthermore, the present invention is also advantageous in that independent movements are provided by it and a subsequent bush can therefore be delivered sooner. In this way the fitting is accelerated. In the prior art, however, individual movements of elements of the fitting apparatus are dependent upon one another, and so a new bush can only be provided when the fitting apparatus is totally clear again.

According to a preferred embodiment the picking apparatus of the present apparatus is provided with a picking mandrel which can pass into a hollow bush and pick up and hold, on the outer surface of said mandrel, the hollow bush on the inner surface thereof.

By means of the picking mandrel the hollow bushes can be picked up particularly easily and practically by one feed device. By picking up the hollow bushes on their inner surface, a sufficient holding force is provided in order to hold the hollow bushes and to convey them further. Moreover, the provision of a picking mandrel offers the advantage within the framework of the picking apparatus that the delivery of a hollow bush from the picking apparatus to a fitting tube is facilitated.

In the machine according to the invention it is advantageous that the longitudinal axes of the picking mandrel, the fitting tube and the filling mandrel extend substantially in a same axial direction. The picking mandrel and the fitting tube with the filling mandrel can thus be aligned with one another easily, and among other things, no further pivot movement of the components in relation to one another is necessary.

In a further preferred embodiment the slip-away device, by means of which the hollow bushes can be delivered from the picking apparatus to the fitting tube, is arranged coaxially to the picking mandrel. In this way an exceptionally compact structure is made possible, and the slip-away device can grasp the hollow bush well for delivery from the picking apparatus to the fitting tube.

Furthermore, the machine according to the invention can be characterised in that the tip of the filling mandrel is formed in the shape of a truncated cone (with a rounded edge) in order to support the delivery of the hollow bushes from the picking apparatus to the fitting tube.

In a further embodiment the slip-over device can be moved in the direction of the fitting tube for the delivery of the hollow bushes such that the slip-over device at least partially also surrounds the fitting tube. In this way complete application of the hollow bushes on the fitting tube is guaranteed. Consequently, the hollow bushes are also applied so far over the fitting tube that when subsequently drawing back the slip-over device, the hollow bushes also remain securely on the fitting tube.

According to a further embodiment the fitting tube is fastened to a fitting tube base and is held by the latter. Provision is made here such that the fitting tube base has a larger diameter than the outer surface of the fitting tube. Furthermore, the fitting tube is preferably designed with a step at one end. If a sufficiently large bush is used, the fitting tube can also be designed without a step, i.e. flush.

The machine according to the invention can be further characterised in that the bush fitting apparatus is attached pivotally to the secure base. Thus, after the hollow bush has been applied to the fitting tube, the bush fitting apparatus can be pivoted so as then to be able to deliver the hollow bush to the cable. In this way a compact structure of the machine according to the invention is achieved.

The present application further relates to a method that offers the same advantages as the apparatus according to the invention.

BRIEF DESCRIPTION OF THE DRAWINGS

An exemplary embodiment of the present invention will be described by means of the following figures.

DETAILED DESCRIPTION OF A PREFERRED EMBODIMENT

In the following the apparatus according to the invention and the method according to the invention are described by means of FIGS. 1-11. In the following the features relating to the apparatus will first of all be described.

Figure 1:
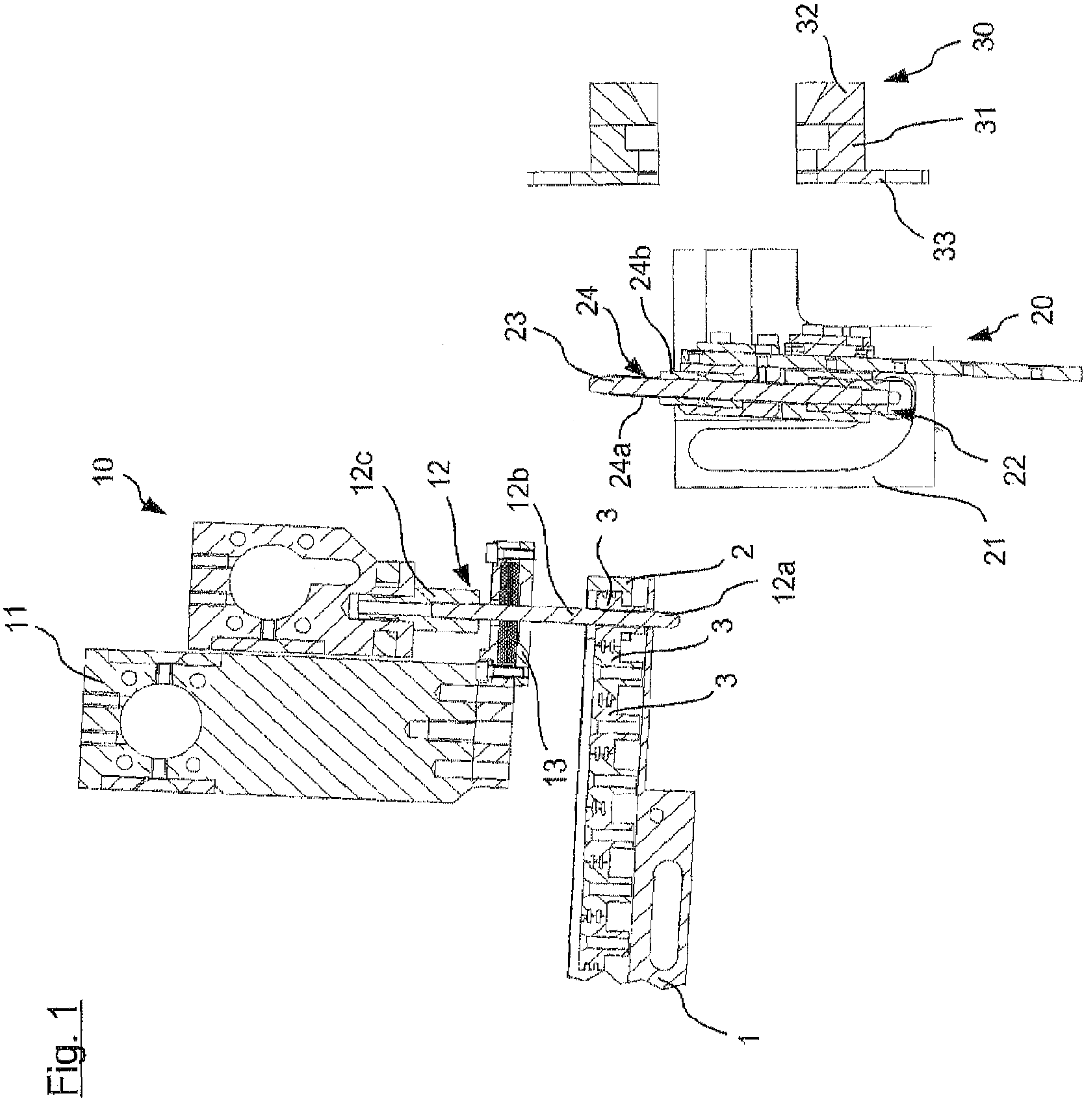
FIG. 1 shows the exemplary embodiment of the present invention when delivering a bush from a feed device.

The apparatus according to the invention comprises a feed rail 1 in which bushes 3 are conveyed. In FIG. 1 a number of bushes 3 are illustrated which are conveyed along the arrow shown to a stop 2 and are then separated.

The apparatus further comprises a picking apparatus 10 which in turn comprises a holder 11 and a picking mandrel 12. The picking mandrel 12 has a cylindrical mandrel **12*a* and a picking mandrel body 12*b* which is also cylindrical. On the end of the picking mandrel 12 opposite the mandrel 12*a* a profile 12*c* is provided in order to receive and hold the picking mandrel 12 in the picking apparatus 10. The profile 12*c* can be a component connected to the picking mandrel body 12*b* or is formed integrally with the latter. Therefore the picking mandrel 12 can be exchanged in the picking apparatus 10**.

The picking mandrel apparatus 10 further comprises a slip-over device 13. As is explained in more detail over the course of the description of the method, the holder 11, fastened to the slip-over device 13, is capable of moving relative to the picking mandrel 12. Both the picking mandrel 12 and the holder 11 are received on and attached to the picking mandrel apparatus 10, but are capable of moving relative to one another.

The apparatus according to the invention further comprises a bush fitting apparatus 20. In the figures a control curve 12 is indicated diagrammatically in order to illustrate the moveability of a filling mandrel apparatus 22. The moveability of the filling mandrel apparatus 22 along the control curve 21 is demonstrated in the present embodiment by pivotability and translatory displaceability. For this reason there are provided on the control curve 21 guide tracks **21*a*, 21*b* along which the filling mandrel apparatus 22** can be pivoted and optionally moved translatorily.

The filling mandrel apparatus 22 comprises a filling mandrel 23. The filling mandrel 23 has at one tip **23*a* (a front end) a taper which is designed so that a bush 3, as will be described in more detail below, can be pushed via the mandrel 23 onto the fitting tube. The filling mandrel 23 further comprises a pencil-shaped region 23*b* and a base region 23*c*. In the present embodiment the base region 23*c* is designed as a separate component that is securely connected to the pencil-shaped region 23*b* of the filling mandrel 23. The pencil-shaped region 23*b* and the tip 23*a* are formed integrally. The filling mandrel 23 is capable of moving relative to the filling mandrel apparatus 22**.

The filling mandrel apparatus 22 further comprises a fitting tube 24 through which the filling mandrel 23 extends. In other words, the fitting tube 24 is arranged concentrically to the filling mandrel 23. Here, in a basic position, the tip **23*a* of the filling mandrel 23 projects at one side of the fitting tube, whereas the pencil-shaped region 23*b* of the filling mandrel 23 extends on the other side of the fitting tube 24. The basic position described is illustrated in FIG. 1. In this situation the bush fitting apparatus 20 is ready to receive a bush 3**.

The fitting tube 24 has a fitting tube end 24 that is designed like a sleeve. The fitting tube 24 further comprises a fitting tube body **24*b* which is integrally formed with the fitting tube end 24***a* and which is cylindrical in form. The fitting tube 24 is capable of moving relative to the filling mandrel apparatus 22 and relative to the filling mandrel 23.

The apparatus according to the invention further comprises a slip-away mask 30 in the region of the bush fitting apparatus 20. The slip-away mask 30, which is shown in FIG. 1 in an open position, is capable of moving relative to the bush fitting apparatus 20. The slip-away mask 30 further comprises a bush slip-away mask 31 which is set up to pick up and optionally enclose a bush. The inner region 31*a* of the bush slip-away mask 31 is of a form substantially corresponding to a bush to which a funnel-shaped insertion mask 32 is applied, which is also called an insertion funnel. At the tapered section (the section facing toward the fitting tube 24 and facing away from the delivered cable 4) the insertion mask 32 has a smaller inner diameter than the inner diameter of the fitting tube 24 in the region of the fitting tube end 24*a*. However, the insertion mask 32 can also be formed integrally with the bush slip-away mask 31. The insertion mask 32 has an inner bore hole 32*a* which is formed in a funnel shape so that, as will be explained in detail later, a cable 4 can be threaded in.

As can be seen, however, the slip-away mask 30 is set up to surround and pick up a bush 3, the slip-away mask 30 being able to touch the bush 3, but does not have to touch it. The slip-away mask 30 is designed in a number of parts and in the corresponding procedural step, as described in more detail below, is moved such as to enclose the bush 3. The slip-away mask 30 further comprises a stop 33 which is provided on the side of the bush slip-away mask opposite the insertion mask 32.

In the following an exemplary procedure for fitting a bush 3 on a cable 4 is described by means of which the features of the apparatus already described will become more comprehensible. The basic procedure follows the sequence according to FIGS. 1-11.

In FIG. 1 a situation is shown in which a bush 3 is delivered by means of the feed rail 1 and rests against the stop 2. The picking mandrel 12 has been guided through the bush 3. The bush is picked up from the picking mandrel by the profile of the picking mandrel 12 or by spreading apart. The picking mandrel can rest flat against the inside of the bush, or also with line or point contact.

In the following, as can be seen by considering FIGS. 1 and 2 together, the picking mandrel 12 moves away in a translatory direction perpendicular to the feed rail 1 and thereby guides the bush 3 from the feed rail 1 to the picking mandrel apparatus 10. In the embodiment shown, the picking mandrel 12 moves until the bush 3 touches the slip-over device 13. Alternatively, a certain distance can be provided between the end of the bush 3 and the slip-over device 13. It is only important that the bush "catches" on the picking mandrel 12 when separated.

Figure 2:
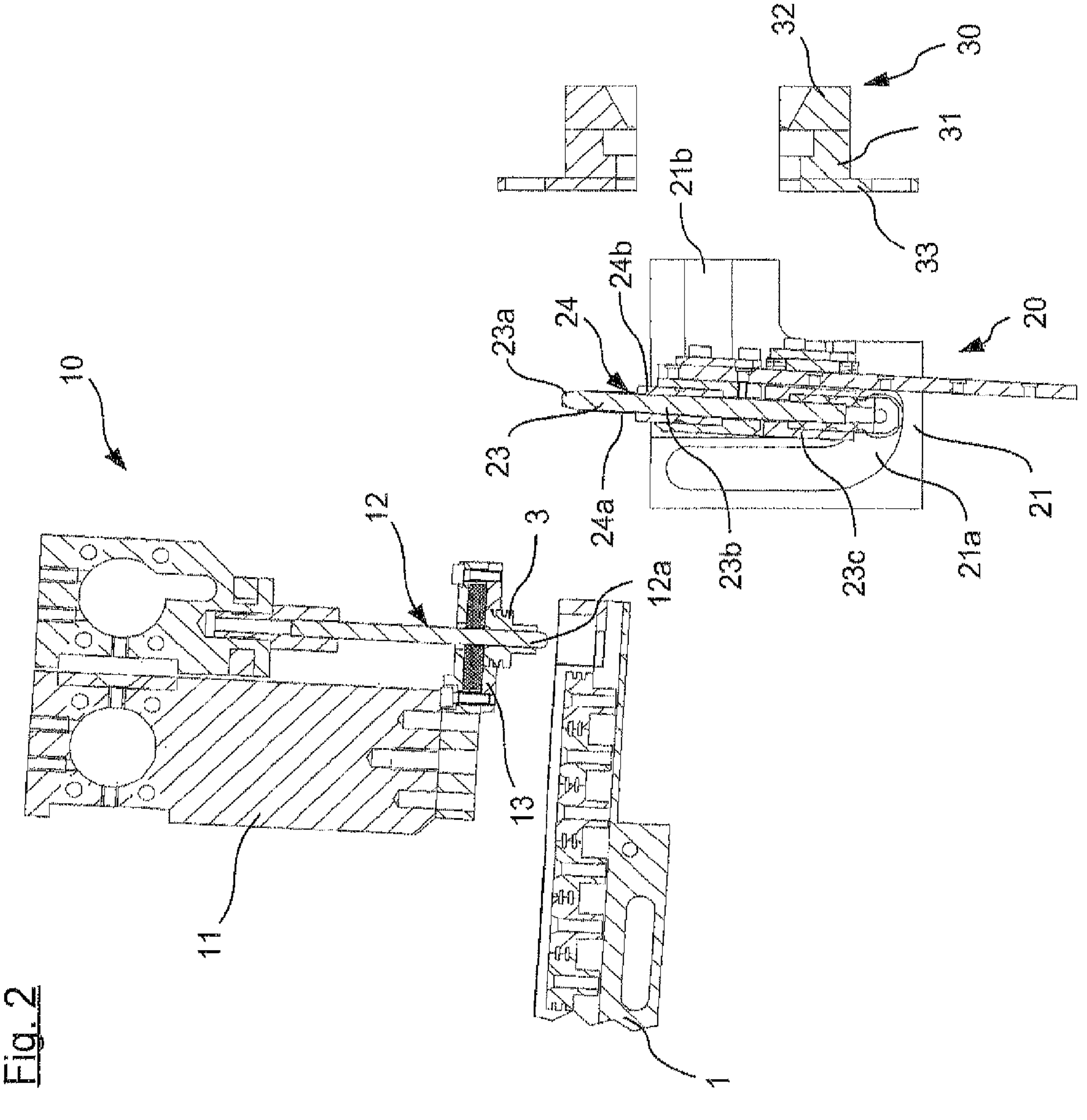
FIG. 2 shows a procedural step subsequent to FIG. 1.

As can be gathered from FIG. 2 in comparison to FIG. 1, the picking mandrel 12 moves a little further after the bush 3 has touched the slip-over device 13. In other words, the bush 3 is already slipped away somewhat from the picking mandrel 13, a sufficient length of the picking mandrel 12 projecting over the bush 3, however, so that the bush 3 is furthermore held by the picking mandrel 12.

Figure 3:
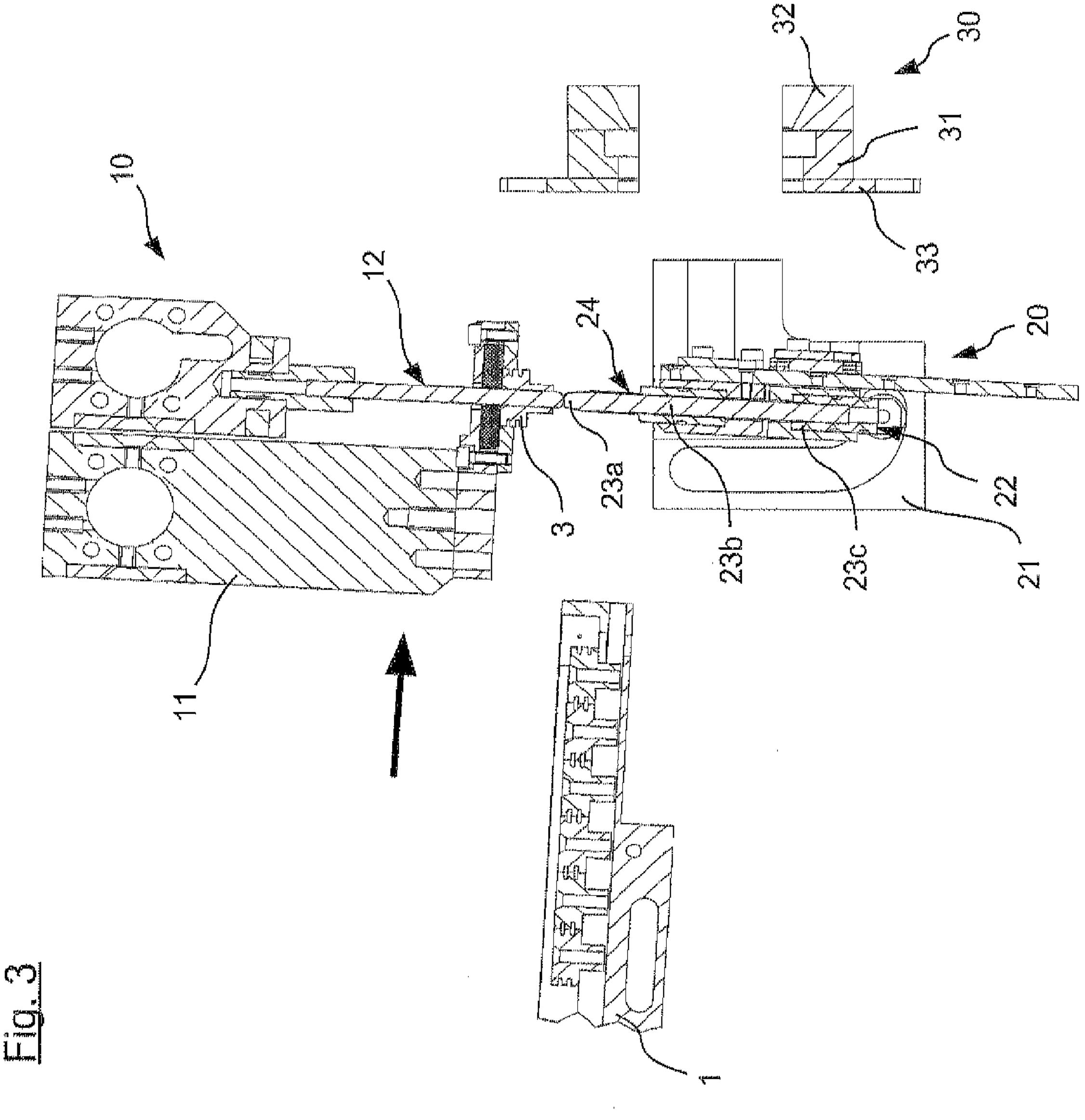
FIG. 3 shows a procedural step subsequent to FIG. 2.

In FIG. 3 the next step of the exemplary procedure is shown. As indicated by the arrow, the picking mandrel apparatus 10 has been moved relative to the feed rail 1. This movement corresponds approximately to the feed direction of the bushes 3 in the feed rail 1.

After the picking mandrel apparatus 10 has been moved in this way, the picking mandrel 12 is located opposite the filling mandrel 23, the respective axes being aligned substantially equally. The filling mandrel 23 and the picking mandrel 12 do not touch one another here, but they can be brought together sufficiently in order to be able to deliver the bush 3. The situation just described is shown in an enlarged view in FIG. 4.

Figure 4:
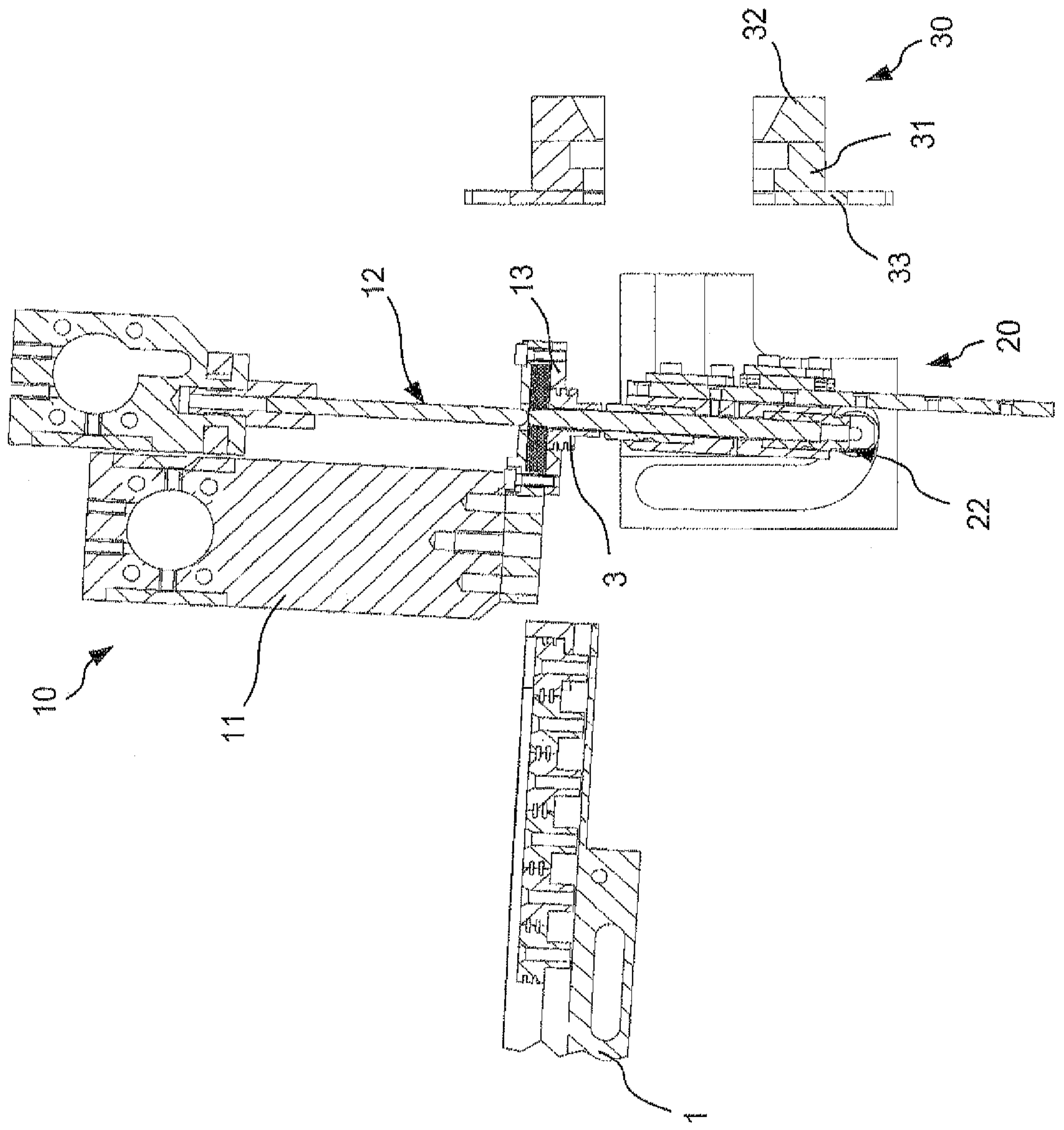
FIG. 4 shows a further procedural step in which a bush has been delivered from a picking apparatus to a bush fitting apparatus.

As shown in FIG. 4, the bush 3 is now delivered by a movement of the slip-over device 13 in the direction of the bush fitting apparatus 20. After the picking mandrel 12 and the filling mandrel 23 have been aligned substantially linearly in relation to one another, when the slip-over device 13 is moved, the bush is slipped away from the picking mandrel 12 and delivered via the tip 23*a* of the filling mandrel to the fitting tube 24 on which the bush can in turn either lie flat or be held with line or point contact.

Figure 5:
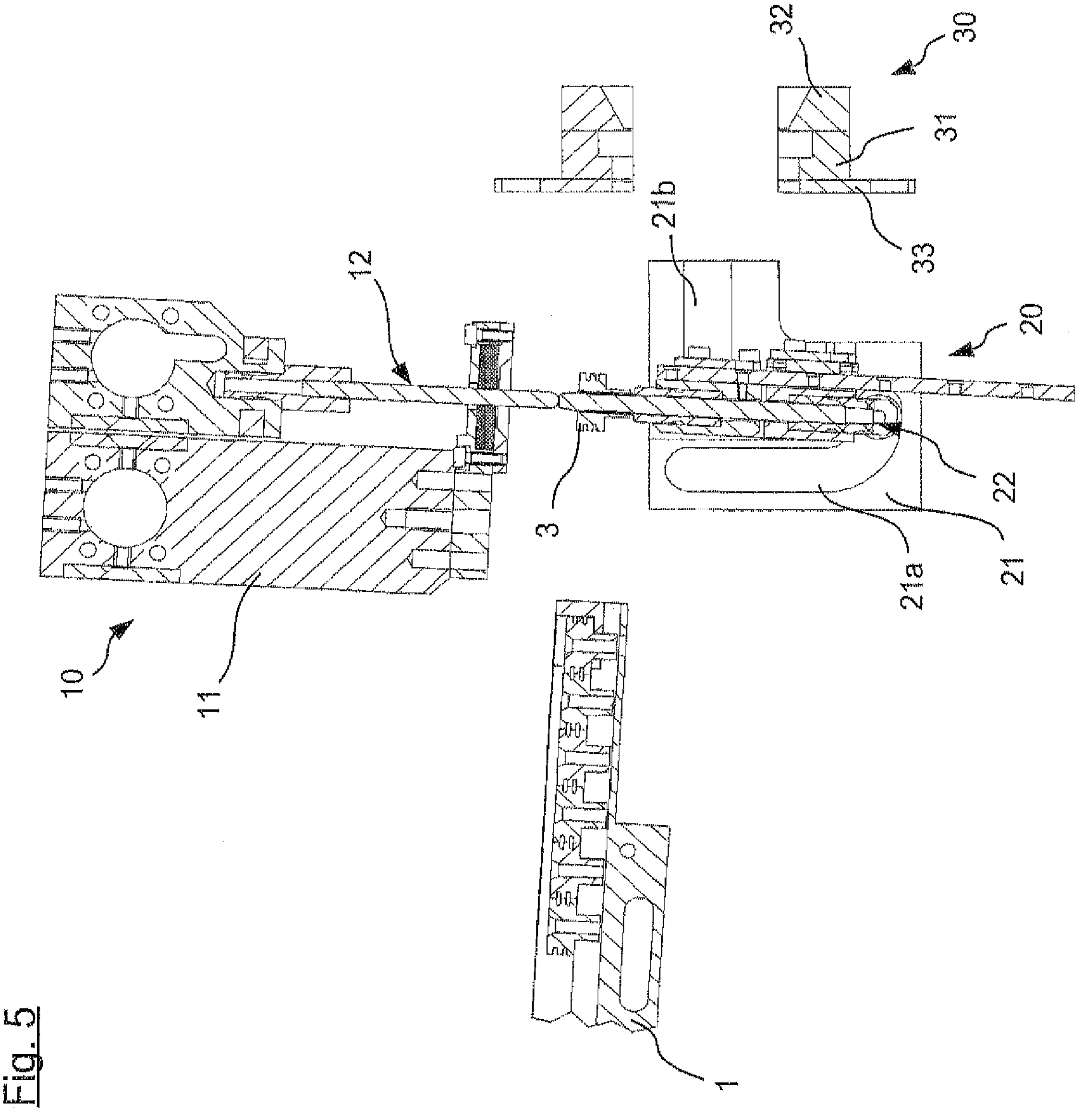
FIG. 5 shows a procedural step after the delivery of a bush from a picking mandrel to a filling mandrel apparatus.

After the bush 3 is now slipped away from the picking mandrel 12, the slip-over device 13 moves, as shown in FIG. 5, away from the bush fitting apparatus 20. This movement is substantially opposite to the movement described above for delivering the bush. Subsequently the slip-over device 13 no longer prevents the picking mandrel apparatus 10 from moving away from the bush fitting apparatus 20.

Figure 6:
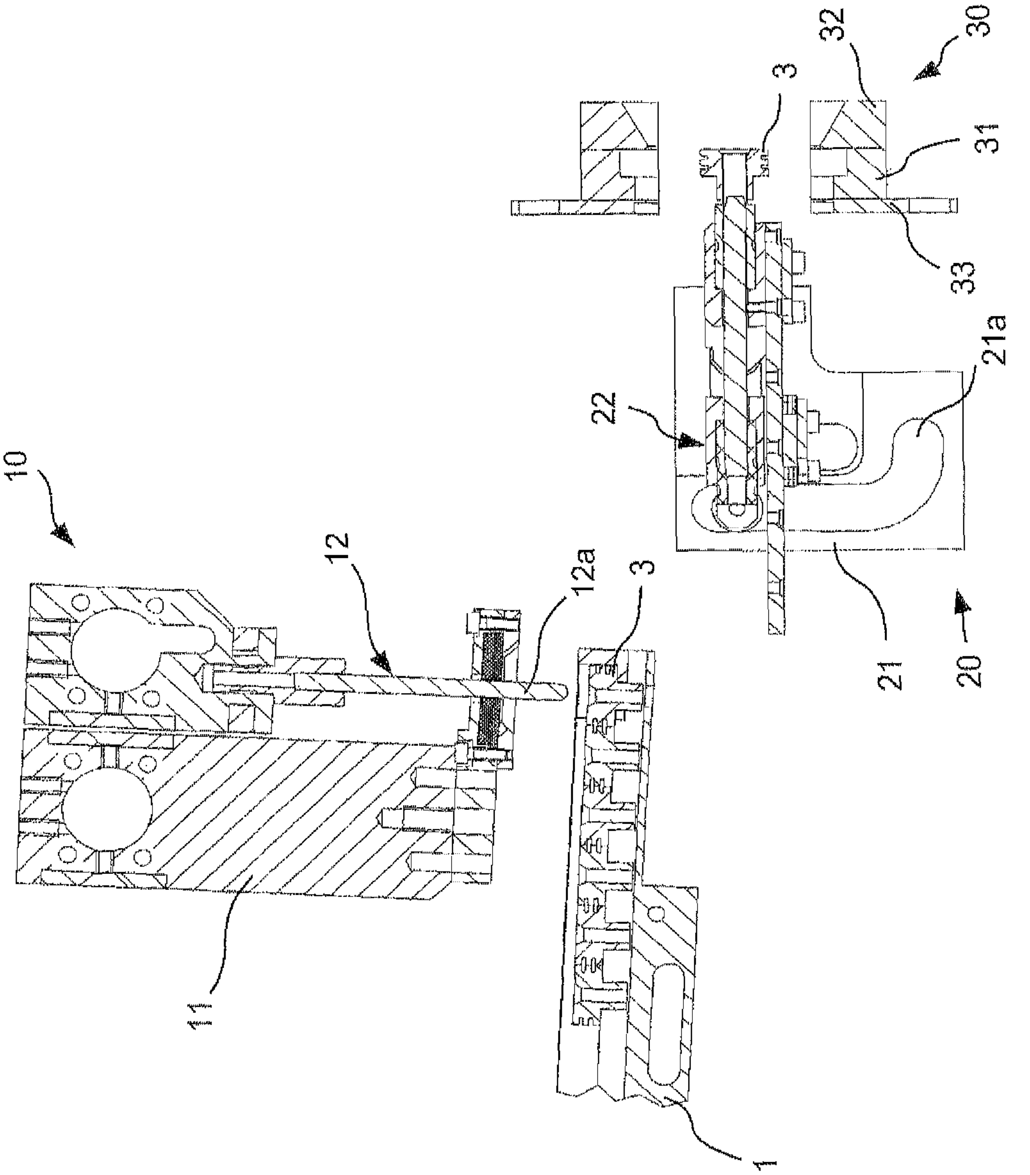
FIG. 6 shows a procedural step subsequent to FIG. 5.

As shown in FIG. 6, the bush fitting apparatus 20 is now pivoted, and in the present exemplary embodiment by $<90°$, preferably by 87°. During this pivot movement the filling mandrel 23 draws back a little, and the fitting tube 24 moves towards a stop (not detailed) of the slip-away mask 30. This process can be seen clearly by considering FIG. 5 and FIG. 6 together.

As is to be understood clearly within this context, the slip-away mask 30 is moved in the direction of the bush 3 held on the fitting tube 24 such that the bush slip-away mask 31 surrounds the bush 3.

As can be seen in FIG. 6, the filling mandrel 23 is drawn back with respect to the fitting tube 24 so that the outer end of the fitting tube end 24*a* forms the outermost position, and the tip 23*a* of the filling mandrel 23 disappears in the fitting tube 24.

Figure 7:
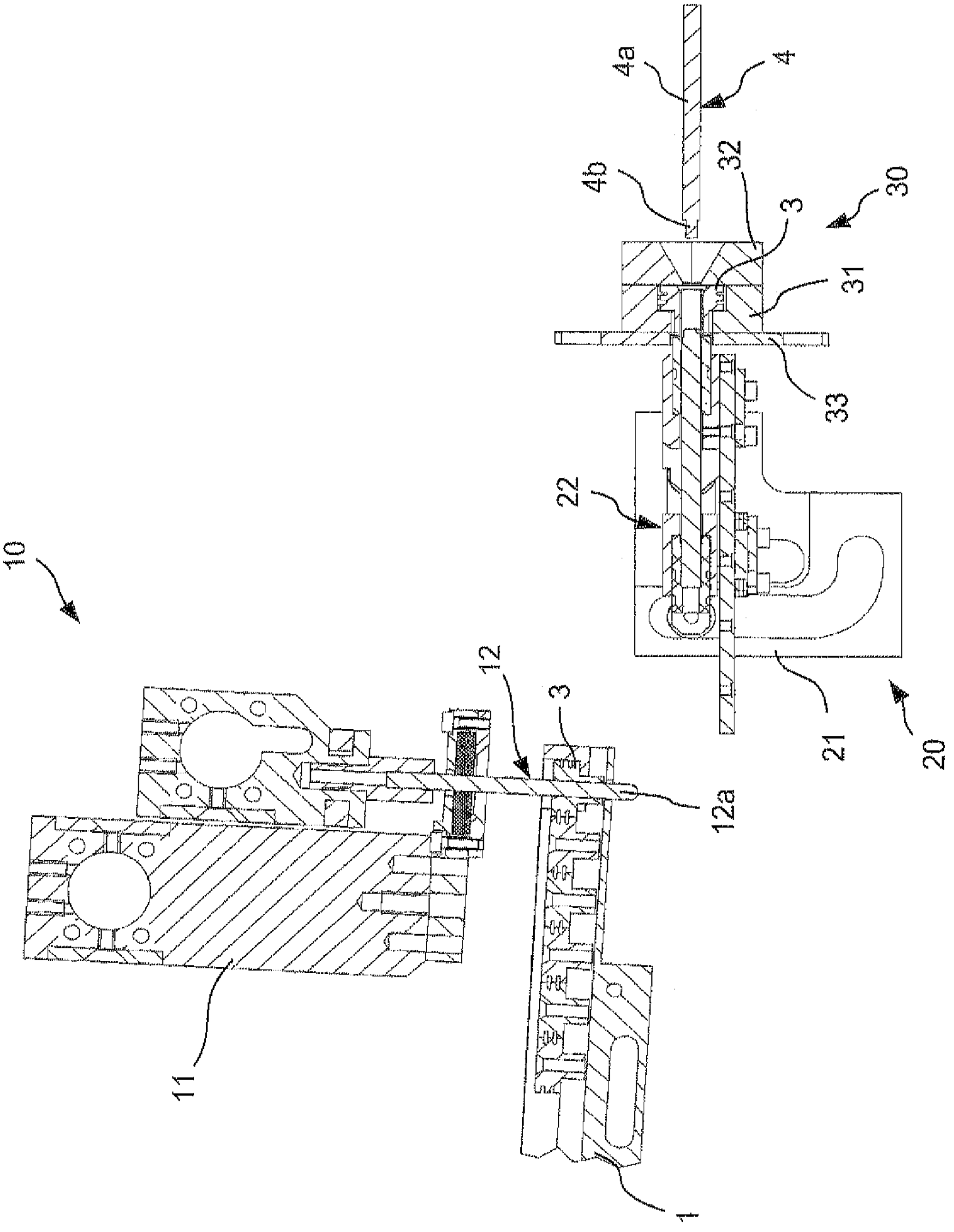
FIG. 7 shows a further procedural step in which a filling mandrel apparatus is shown in a pivoted position.

As can be seen furthermore in FIG. 7, a cable 4 has been delivered that already has an exposed wire 4*b* and a cable jacket 4*a*. In another embodiment, however, the cable 4 can also be provided without an exposed wire. The filling mandrel 23, the fitting tube 24 and the cable 4 are located in approximate linear alignment to one another.

Figure 8:
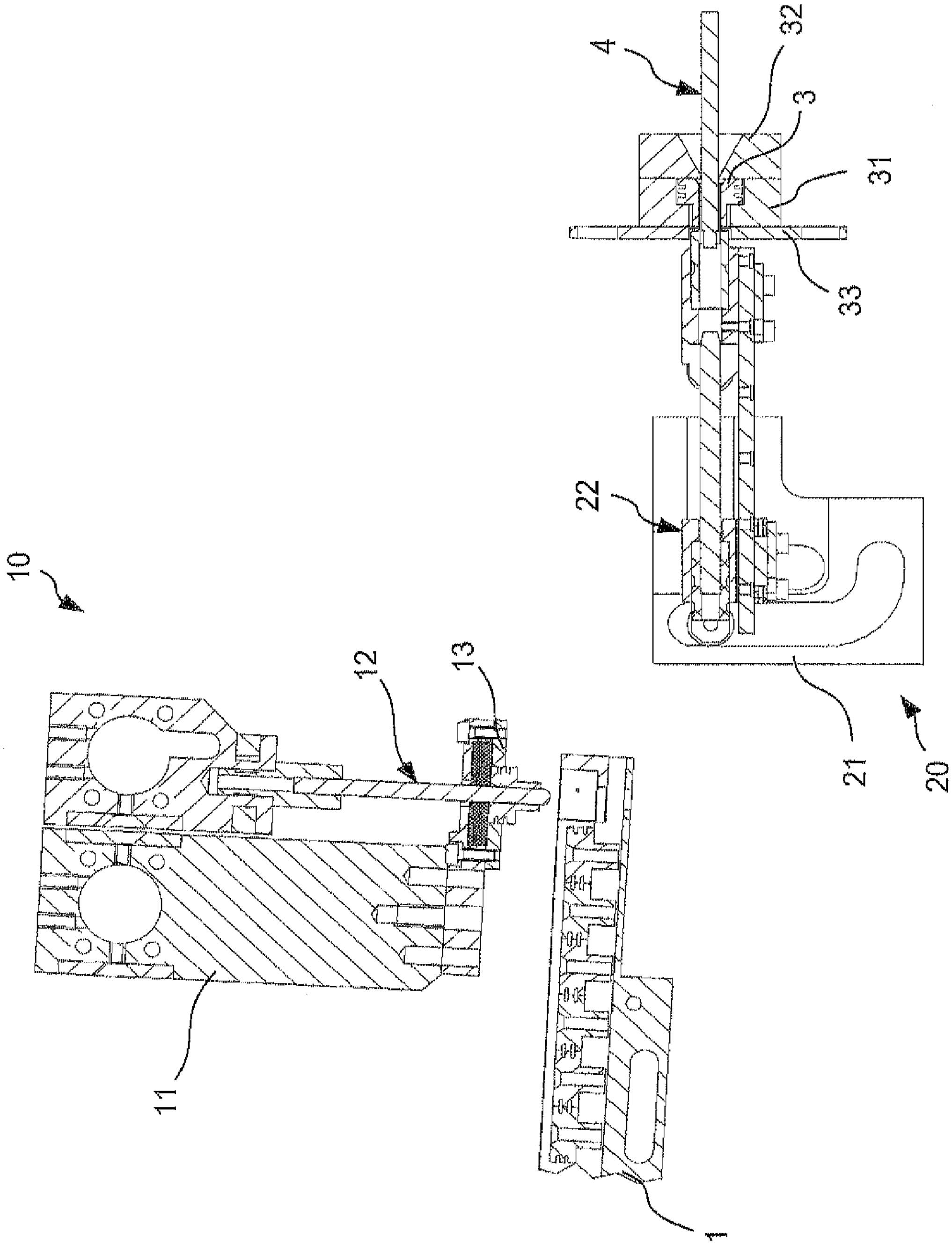
FIG. 8 shows a procedural step subsequent to FIG. 7.

In the following, as can be seen in FIG. 8, the fitting tube 24 is moved further in the direction of the cable 4. The slip-away mask 30 is moved together with the movement of the fitting tube 24. On the other hand, the filling mandrel 23 remains in exactly the same drawn back position.

As can be seen in FIG. 8, the bush 3 has now been drawn up with the fitting tube 24 moved forwards and the slip-away mask 30 moved at the same time over the cable 4.

Figure 9:
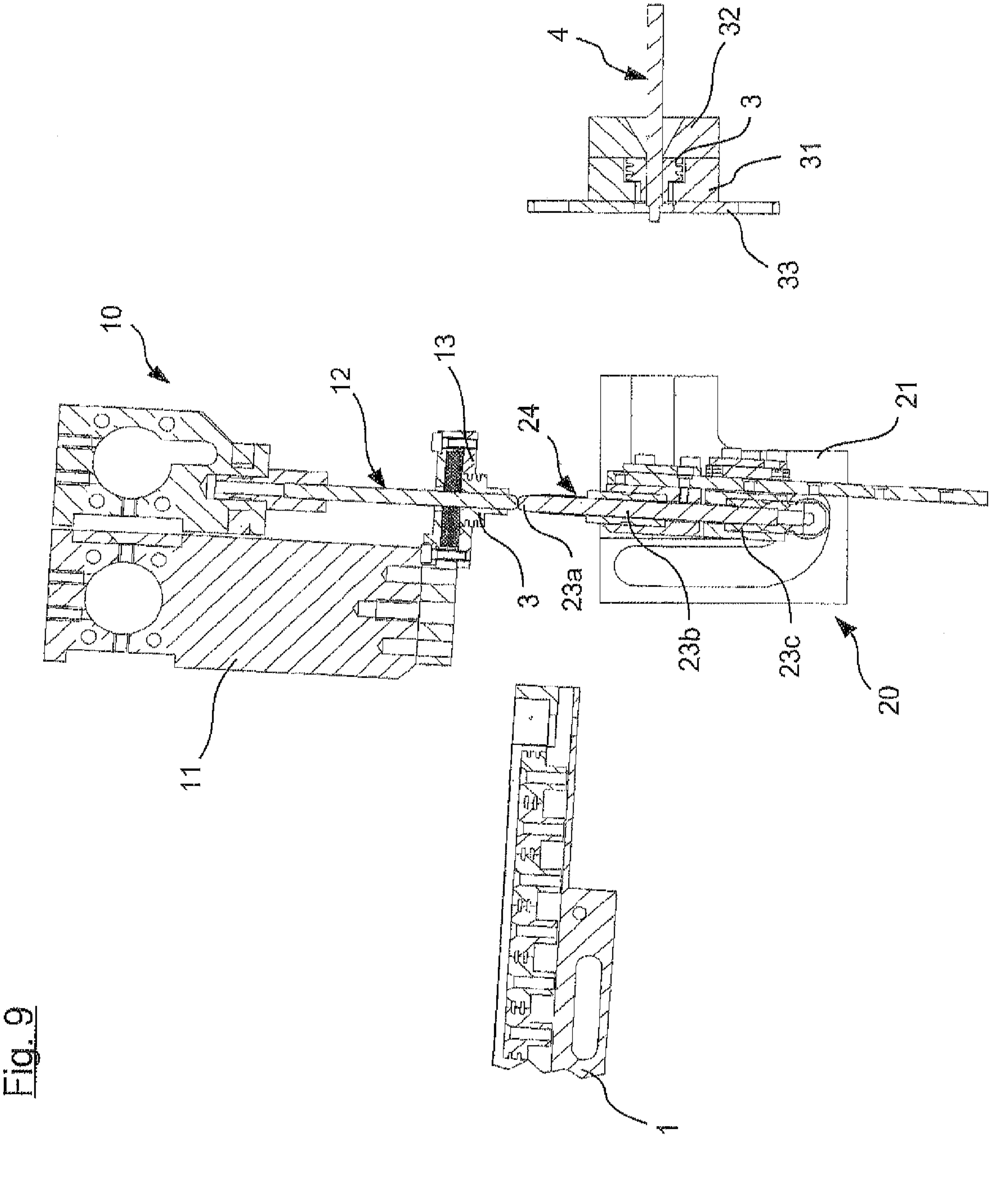
FIG. 9 shows a further procedural step in which the filling mandrel apparatus has been pivoted back into the initial position after delivery of the bush to a cable.

Then the fitting tube 24 is moved back, by means of which the bush 3 held back from the slip-away mask 30 is slipped away from the fitting tube 24. In FIG. 9 the filling mandrel apparatus 22 is shown already back in the pivoted back position when delivering a new bush 3. Over the course of this pivot movement the filling mandrel 23 is moved again such that it projects out of the fitting tube 24 (basic position), and so supports the delivery of a bush 3 from the picking mandrel 12.

Figure 10:
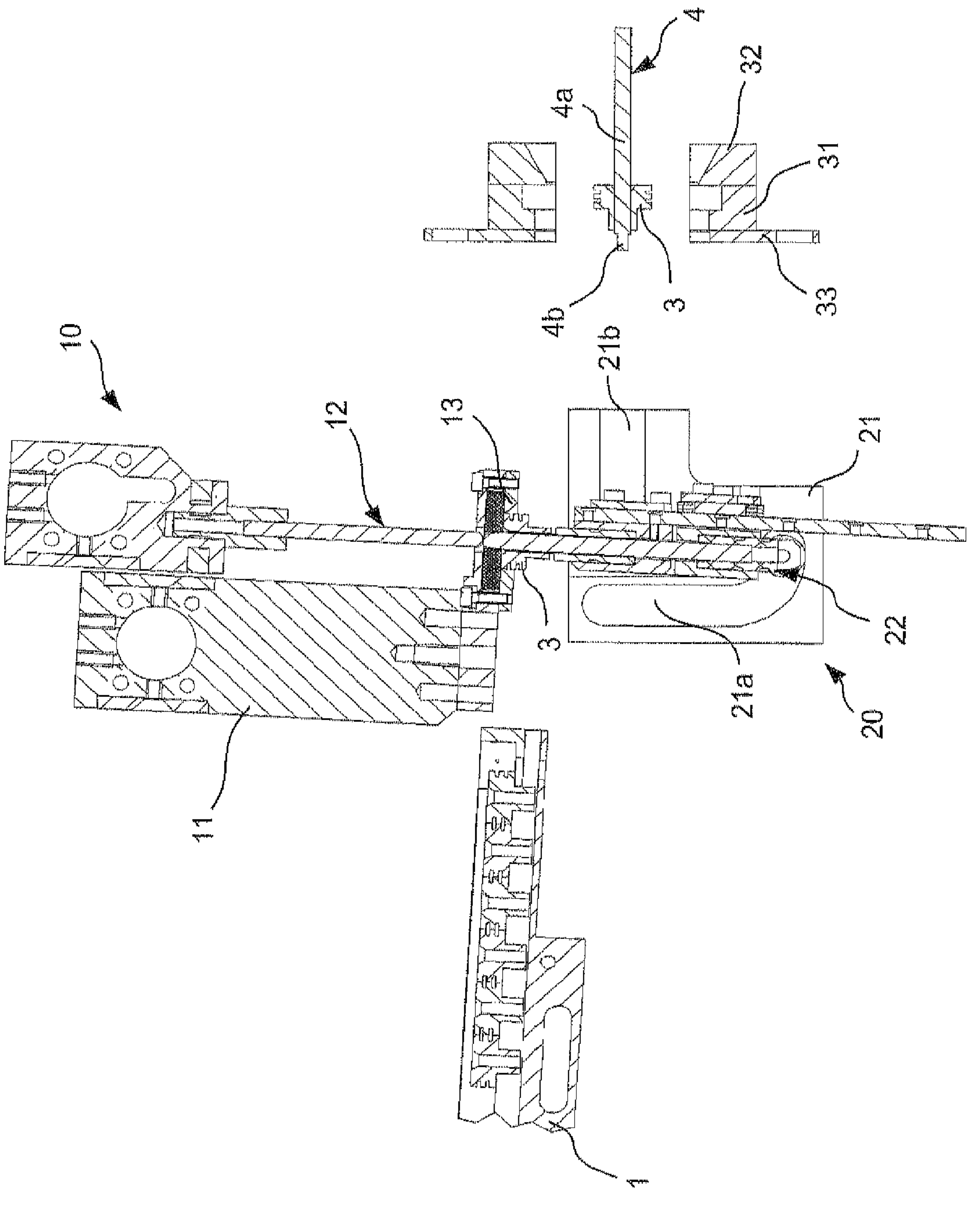
FIG. 10 shows a procedural step subsequent to FIG. 9 in which a further bush is delivered from the picking mandrel.
Figure 11:
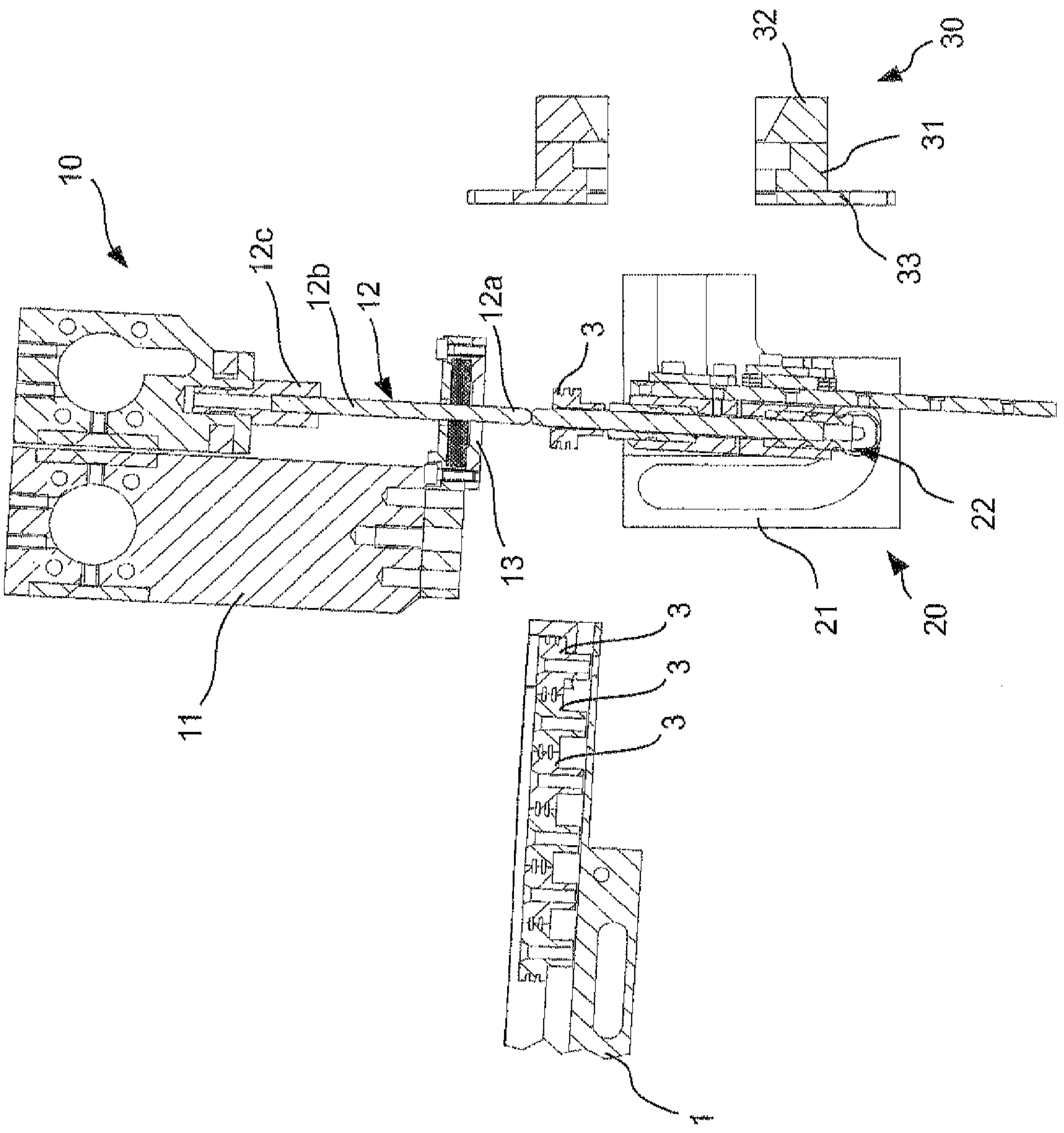
FIG. 11 shows a procedural step subsequent to FIG. 10.

While the further bush 3 is now delivered from the picking mandrel 12 to the fitting tube 24, the slip-away mask 30 opens, as shown in FIG. 10. Next the slip-away mask 30 moves in the direction of the bush fitting apparatus 20 and forms a stop for the bush fitting apparatus 20 which is pivoting and moving forwards. In this way the bush fitting apparatus can be moved independently until the latter comes into contact with the stop. They then move together over the rest of the stroke. FIG. 11 then shows a position of the described apparatus which corresponds substantially to that of FIG. 5.

As already described, the bush fitting apparatus 20 is pivoted by <90°, preferably 87°, in order to be aligned with the cable 4. Consequently, the picking mandrel 12 also forms a corresponding angle, preferably of 87°, relative to the cable 4. The picking mandrel 12 in turn is aligned perpendicularly to the feed rail 1. Before pivoting, the picking mandrel deviates by approximately 3° from a perpendicular to the ground (direction of gravity). The slight deviation is produced by the feed rail being inclined by approximately 3° in relation to a horizontal direction so that a constant supply of bushes is guaranteed and supported. The tip 23*a* of the filling mandrel 23 can adopt different shapes. It is important here that the tip 23*a* is designed in order to support the delivery of the bush 3 from the picking mandrel 12 to the fitting tube 24.

By dividing the bush fitting apparatus 20 into a picking mandrel 23 and a filling mandrel 24, the number of different diameter pairings can be drastically reduced. In this way a wide variety of combinations of bushes and cable cross-sections can be processed by the bush fitting apparatus 20. For this purpose it is necessary for the picking mandrel 12 and the filling mandrel 23, and also the fitting tube 24, to be interchangeable. However, different bushes 3 with different inner diameters, which only vary by a relatively small amount, can be drawn onto a common fitting tube 24 with the aid of a filling mandrel 23 according to the present invention so that excessive changing of fitting tubes 24 is eliminated.

The invention claimed is:

1. A machine for delivering hollow bushes supplied and for fitting individual hollow bushes to a cable, comprising:

a bush fitting apparatus for fitting individual hollow bushes to a cable, the bush fitting apparatus having a fitting tube that picks up and holds, on an outer surface of said tube, the hollow bushes on an inner surface thereof, and in which the cable is arranged for the fitting of the hollow bushes;

a picking apparatus configured to move downwardly into engagement with the hollow bushes in a feed device, to lift the engaged hollow bushes upwardly from the feed device and to move the lifted hollow bushes laterally into axial alignment with the fitting tube; and a delivery apparatus for delivering the hollow bushes from the picking apparatus to the bush fitting apparatus, wherein the delivery apparatus comprises:

a slip-over device which moves relative to the picking apparatus, by which the hollow bushes are delivered from the picking apparatus to the fitting tube, and a filling mandrel which protrudes through the fitting tube in order to deliver the hollow bush from the picking apparatus to the bush fitting apparatus and moves back out of the fitting tube in order to fit the hollow bush on the cable.

2. The machine according to claim 1, in which the picking apparatus comprises a picking mandrel which passes into the hollow bush and on its outer surface receives and holds the hollow bush on its inner surface.

3. The machine according to claim 2, in which the longitudinal axes of the picking mandrel, the fitting tube and the filling mandrel are aligned substantially equally.

4. The machine according to claim 2, in which the slip-over device is arranged coaxially around the picking mandrel.

5. The machine according to claim 1, in which the tip of the filling mandrel is formed in the shape of a truncated cone in order to support the delivery of the hollow bushes from the picking apparatus to the fitting tube.

6. The machine according to claim 1, in which the slip-over device is moved in order to deliver the hollow bushes in the direction of the fitting tube such that the slip-over device at least partially surrounds the fitting tube.

7. The machine according to claim 1, in which the fitting tube is fastened to a fitting tube base and held by the latter.

8. The machine according to claim 1, in which the bush fitting apparatus is attached pivotally to a fixed base.

9. A method for delivering hollow bushes supplied and for fitting hollow bushes to a cable, the method comprising:

moving a picking apparatus downwardly into engagement with a hollow bush in a feed device;

lifting the engaged hollow bush upwardly from the feed device with the picking apparatus, moving the picking apparatus laterally so that the lifted hollow bush is axially aligned with a fitting tube of a bush fitting apparatus, a filling mandrel projecting through the fitting tube in a direction of the picking apparatus, moving a slip-over device which moves relative to the picking apparatus in order to deliver the hollow bushes from the picking apparatus to an outer surface of the fitting tube, aligning the fitting tube with a cable and moving the fitting tube in a direction of the cable so that the filling mandrel withdraws from the fitting tube and the cable penetrates into the fitting tube, and delivering the hollow bush by drawing back the fitting tube, the hollow bush being held back on the cable.

10. The method according to claim 9, wherein the picking apparatus is displaced with a translatory movement in order to align the picking apparatus with the fitting tube.

11. The method according to claim 9, wherein the bush fitting apparatus is pivoted with the fitting tube in order to align the fitting tube with a cable.

12. The method according to claim 9, wherein upon moving the slip-over device the latter is moved in the direction of the fitting tube such that the slip-over device at least partially surrounds the fitting tube.

13. The method according to claim 9, wherein the fitting tube of the bush fitting apparatus is pivoted and strikes against a stop in order to be aligned to the cable.

14. The method according to claim 9, wherein the picking apparatus comprises a picking mandrel which can pass into the hollow bush and on its outer surface can receive and hold the hollow bush on the inner surface thereof.

15. The method according to claim 9, wherein the filling mandrel is drawn back during the alignment of the fitting tube with the cable, and the filling mandrel remains in its position when moving the fitting tube in the direction of the cable.

* * * * *